United States Patent [19]
Barry et al.

[11] 4,419,044
[45] Dec. 6, 1983

[54] GAS TURBINE ENGINE

[75] Inventors: Brian Barry, Duffield; John H. R. Sadler, Aston-on-Trent; Susan M. Allen, Belper, all of England; David W. Artt, Moira, Northern Ireland

[73] Assignee: Rolls-Royce Limited, London, England

[21] Appl. No.: 318,851

[22] Filed: Nov. 6, 1981

[30] Foreign Application Priority Data

Dec. 18, 1980 [GB] United Kingdom ............... 8040500

[51] Int. Cl.³ .............................................. F01D 11/08
[52] U.S. Cl. ...................................... 415/117; 415/175
[58] Field of Search .................. 415/14, 114, 116, 117, 415/175

[56] References Cited
U.S. PATENT DOCUMENTS

| | | | |
|---|---|---|---|
| 2,684,568 | 7/1954 | Senger | 415/14 |
| 3,966,353 | 6/1976 | Booher | 415/116 X |
| 4,199,300 | 4/1980 | Tubbs | 415/114 X |
| 4,318,666 | 3/1982 | Pask | 415/116 |

FOREIGN PATENT DOCUMENTS

| | | | |
|---|---|---|---|
| 2550100 | 5/1976 | Fed. Rep. of Germany | 415/116 |
| 1484288 | 9/1977 | United Kingdom | 415/116 |

*Primary Examiner*—Philip R. Coe
*Assistant Examiner*—Arthur D. Dahlberg
*Attorney, Agent, or Firm*—Cushman, Darby & Cushman

[57] ABSTRACT

A gas turbine engine has a turbine which includes an annular array of rotary aerofoil blades surrounded by an annular shroud member. All or a major portion of the annular shroud member is constituted by a heat pipe. A distance measuring device is provided to measure the clearance between the tips of the rotary aerofoil blades and the shroud member and its output is monitored by a control unit. The control unit is adapted to control a valve which regulates the flow rate of cooling air directed onto the heat pipe. The arrangement is such that the temperature of the heat pipe is maintained at a level which is consistent with the clearance between the rotary aerofoil blade tips and the annular shroud member being within a predetermined range of values.

10 Claims, 4 Drawing Figures

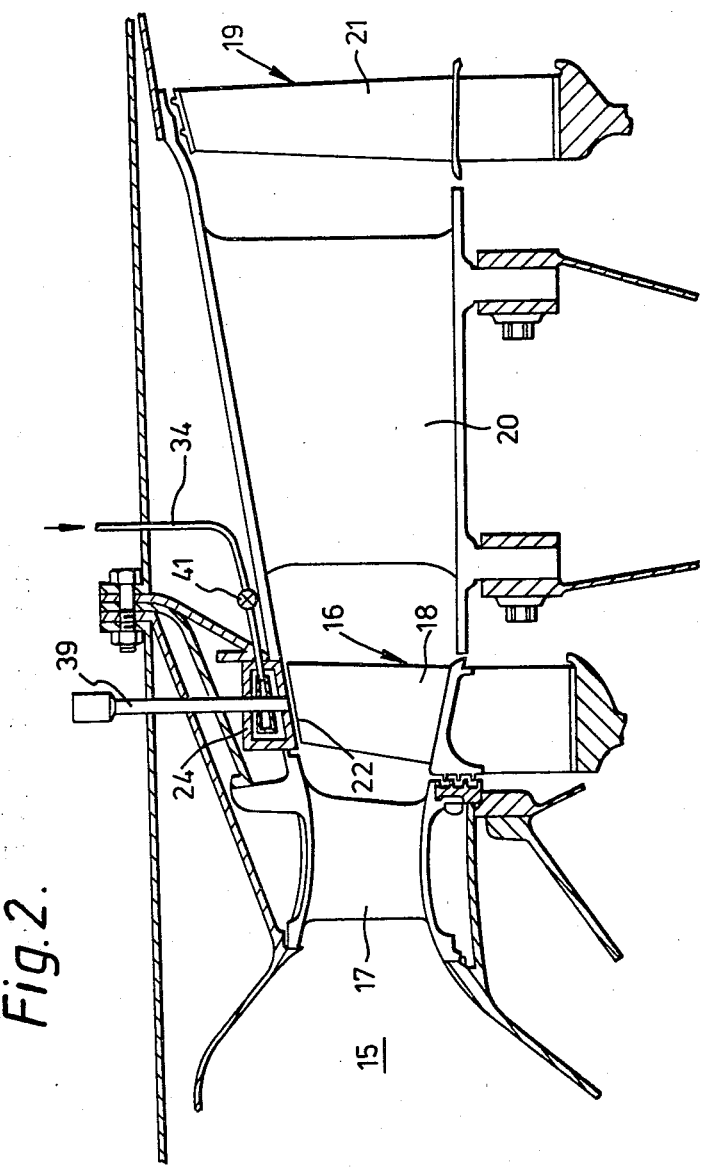

GAS TURBINE ENGINE

This invention relates to gas turbine engines and in particular to the turbines of such engines.

The efficiency of the turbine of a gas turbine engine is dependent upon various factors, one of which is the radial clearance between the tips of its rotary aerofoil blades and the structure which surrounds them. Thus if the clearance is too great, an unacceptable degree of gas leakage will occur across the tips with a resultant loss in efficiency. However, if the clearance is reduced in order to reduce the leakage and consequently improve the efficiency, there is a danger that under certain conditions, contact will occur between the rotary blade tips and the surrounding structure. This danger is particularly acute when the engine rotational speed is either increasing or decreasing since differing rates of thermal expansion of turbine components sometimes result in the rotary blades and the surrounding structure radially expanding and contracting at differing rates.

It is known to provide means which are adapted to maintain rotary blade tip clearances at a substantially constant value. Such means usually include an annular shroud member which surrounds the rotary blade tips and is either mechanically or thermally actuated in order to maintain a substantially constant radial blade tip clearance. The mechanical devices suffer from the disadvantage of adding mechanical complication to the engine as well as incurring undesirable weight penalties. The thermally actuated devices rely upon a flow of cooling air on to the shroud member so as to maintain its temperature at a value which is consistent with the shroud member being of such a size that the blade tip clearances are of the desired magnitude. However, complicated air passages have to be provided in the shroud member in order to ensure that effective cooling takes place. Moreover such shroud members are prone to localised thermal gradients which can result in turn in localised variations in blade tip clearances. In addition to causing such variations in blade tip clearances, localised thermal gradients are also undesirable in that they can result in the distortion and even cracking of the shroud member.

It is an object of the present invention to provide a turbine suitable for a gas turbine engine in which rotary blade tip clearances are maintained at a substantially constant value by thermally actuated means which substantially avoids the previously mentioned disadvantages of rotary blade tip clearance maintenance means which are thermally actuated.

According to the present invention, a turbine suitable for a gas turbine engine includes an annular array of rotary aerofoil blades, an annular shroud member adapted to define an annular radially inwardly facing surface, a major portion of said annular shroud member being constituted by at least one heat pipe, said annular shroud member being located coaxially with and radially outwardly of said rotary aerofoil blades so that the tips of said rotary aerofoil blades and said annular radially inwardly facing surface are positioned adjacent each other but radially spaced apart so as to provide a radial clearance therebetween, distance measuring means, the output of which is proportional to said clearance between said blade tips and said annular radially inwardly facing surface, means adapted to direct a temperature regulating fluid on to said at least one heat pipe, means adapted to regulate the flow rate of said temperature regulating fluoid on to said at least one heat pipe, said flow rate regulating means and said distance measuring means being interconnected by control means so adapted as to control said flow rate regulating means in response to the output of said distance measuring means whereby a sufficient amount of said temperature regulating fluid is directed on to said at least one heat pipe to control the thermal expansion or contraction thereof, that said radical clearance between said radially inwardly facing surface and said blade tips, as measured by said distance measuring means, is maintained within a predetermined range of values.

Said annular shroud member may be so configured that an annular chamber is defined therein, said annular chamber being at least partially defined by said at least one heat pipe, said means adapted to direct said temperature regulating fluid on to said at least one heat pipe being at least partially located within said annular chamber and so configured as to direct at least some of said temperature regulating fluid on to those areas of said at least one heat pipe which at least partially defines said annular chamber.

Said temperature regulating fluid is preferably cooling air.

Said annular radially inwardly facing surface may be interconnected with said annular chamber within said annular shroud member by a plurality of passages, said passages being so disposed as to direct cooling air from said annular chamber to said annular, radially inwardly facing surface to provide film cooling thereof.

Said annular shroud member may be provided with additional passages which interconnect said annular chamber with any areas of said shroud member, other than said annular radially inwardly facing surface, which are exposed to the gas stream passing in operation through said turbine, said passages being so disposed as to provide film cooling of those areas.

Said major portion of said annular shroud constituted by at least one heat pipe may be annular and of generally U-shaped cross-section to provide two radially inwardly extending flanges, said flanges being bridged by means adapted to define said annular, radially inwardly facing surface, so that said major annular shroud portion and said means adapted to define said annular radially inwardly facing surface together define said annular chamber.

Said means adapted to define said annular radially inwardly facing surface may comprise a plurality of abutting tiles.

Said tiles may be either metallic or ceramic.

The invention will now be described, by way of example, with reference to the accompanying drawings in which:

FIG. 2 is a sectioned side view of a portion of the turbine of the gas turbine engine shown in FIG. 1.

Figure 1:
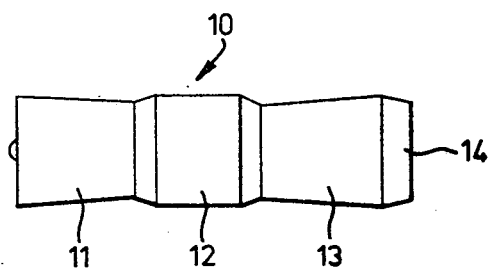
FIG. 1 is a side view of a gas turbine engine which includes a turbine in accordance with the present invention.

With reference to FIG. 1 a gas turbine engine generally indicated at 10 consists of a compressor 11, combustion equipment 12 and a turbine 13. The gas turbine engine 10 operates in the conventional manner, that is, air compressed by the compressor 11 is mixed with fuel and combusted in the combustion equipment 12. The resultant hot gases expand through the turbine 13, which in turn drives the compressor 11, and are exhausted to atmosphere through a propulsion nozzle 14.

The combustion equipment 12 comprises an annular combustion chamber 15, a portion of the downstream end of which can be seen in FIG. 2. Hot gases from the combustion chamber 14 are directed into the high pressure section 16 of the turbine 13 by an annular array of nozzle guide vanes, one of which can be seen at 17. In this particular case, the high pressure turbine 16 consists of a single stage of rotary aerofoil blades one of which can be seen at 18. It will be appreciated however that the high pressure turbine 16 could in fact consist of more than one stage of rotary aerofoil blades. The high pressure turbine 16 is drivingly connected by way of a suitable shaft (not shown), to the high pressure section of the compressor 11.

The hot gases issued from the high pressure turbine 16 are directed into the low pressure section 19 of the turbine 13 by a second annular array of stationary nozzle guide vanes, one of which can be seen at 20. As in the case of the high pressure turbine 16, the low pressure turbine 19 consists of a single stage of rotary aerofoil blades one of which can be seen at 21. The low pressure turbine 19 is drivingly connected by a further suitable shaft (not shown) to the low pressure portion of the compressor 11. The hot gases issued from the low pressure turbine 19 pass through an annular array of outlet guide vanes (not shown) before being exhausted to atmosphere through the nozzle 14.

In order to ensure that as much as possible of the hot gases directed by the high pressure nozzle guide vanes 17 pass over the aerofoil sections of the high pressure turbine rotary aerofoil blades 18, the tips 22 of the aerofoil blades 18 are arranged to pass as closely as possible to an annular shroud 23.

Figure 3:
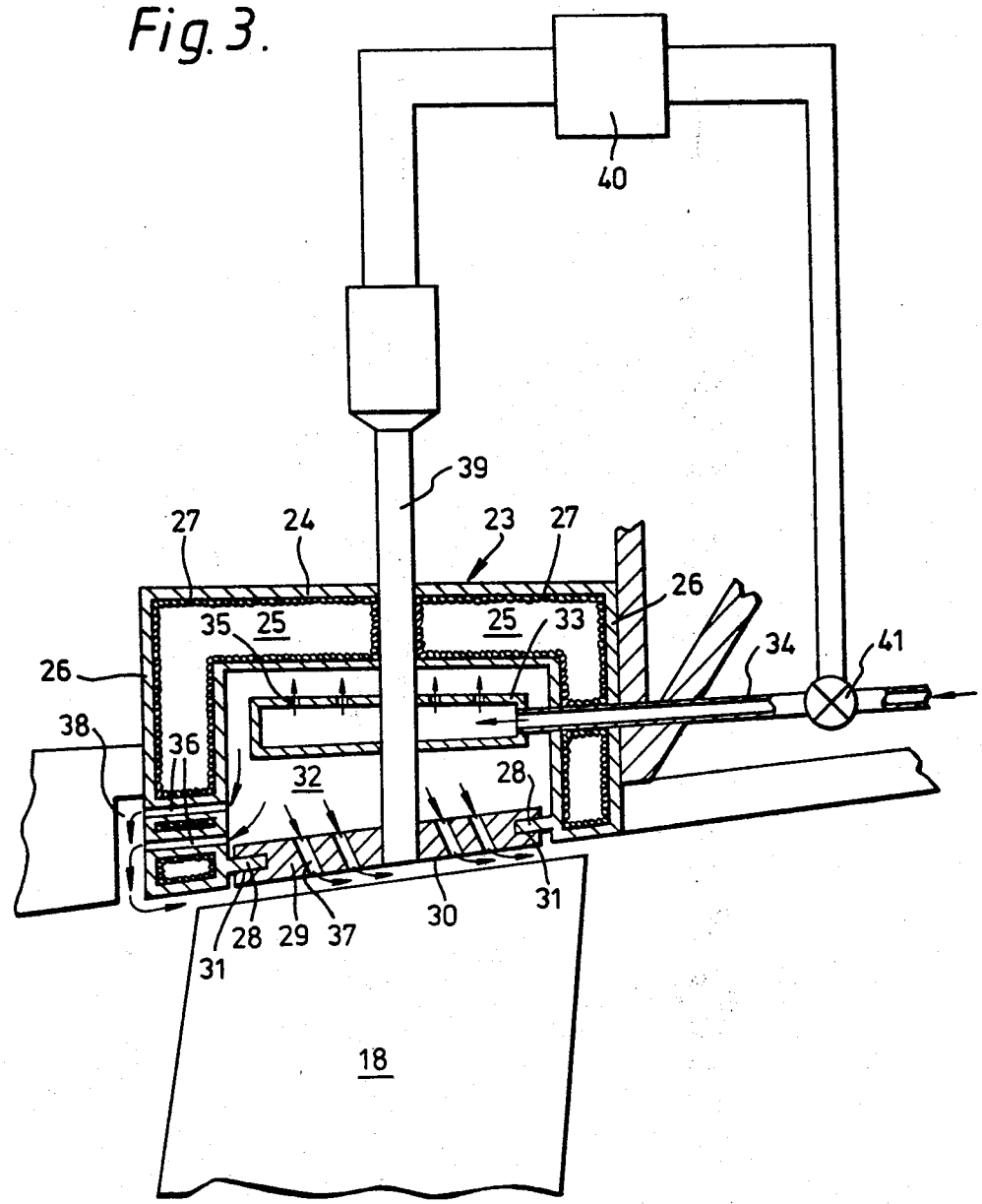
FIG. 3 is an enlarged view of part of the turbine portion shown in FIG. 2.

The annular shroud 23, which can be seen more clearly in FIG. 3 is positioned coaxially with the axis of rotation of the rotary aerofoil blades 18. It comprises an annular member 24 which is constituted by a heat pipe 25 and which is of generally U-shaped cross-section so as to provide two radially inwardly extending flanges 26.

Throughout this specification the term "heat pipe" is to be understood as meaning a heat transfer device comprising a sealed container which encloses both a condensable vapour and capillary means capable of causing the transport of the condensed vapour from a cooler area of the container to a hotter area, the condensable vapour being transported from the hotter area to the cooler area by the vapour pressure gradient between the two areas, the vapour being condensed in the cooler area.

The variation of vapour pressure with temperature of such substances, as water, ammonia, mercury, potassium, sodium, lithium and lead, is such that a change in temperature of only 1° or 2° C. gives a very large change in their vapour pressure. Consequently the temperature differences occuring along the length of a heat pipe containing one of these substances as the condensable vapour are so small as to render the heat pipe substantially isothermal. In practice, the effective thermal conductivity of a heat pipe can be as much as 500 times greater than that of a solid copper rod having the same mass. The principles behind heat pipes are more thoroughly set out in "Structure of Very High Thermal Conductance" Grover, Cotter and Erickson, Journal of Applied Physics Vol. 35, 1990 (June 1964).

The internal walls of the heat pipe 25 are covered with a stainless steel mesh 27 which functions as the heat pipe capillary. It will be appreciated, however, that alternative capillary materials such as porous glass, metal or ceramic could be utilised.

In order for the heat pipe 25 to function as such it is evacuated and contains a small amount of sodium as the condensable vapour. Other materials could, however, be utilised as the condensable vapour depending upon the temperature range in which the heat pipe 25 is expected to operate.

The radially inwardly extending flanges 26 of the annular member 24 are each provided with a further flange 28. The further flanges 28 are directed towards each other to provide supports for a plurality of abutting metallic tiles 29 which together define an annular radially inwardly facing surface 30 which is adjacent but radially spaced apart from the lips of the rotary aerofoil blades 18. Grooves 31 are provided in the tiles 29 to receive the flanges 37. Thus the tiles 29 and the annular member 24 together define an annular chamber 32. It may be convenient in certain cases to use tiles 29 which are made from a ceramic material instead of a metal in order to reduce the amount of heat conducted to the heat pipe 25 from the hot gas stream passing in operation through the turbine 13.

The annular chamber 32 contains a hollow annular, generally rectangular cross-section member 33 which is fed with cooling air derived from the compressor 11 of the engine 10 via a supply pipe 34. The radially outer surface of the rectangular cross-section member 33 is provided with a number of holes 35 which are arranged so as to direct cooling air on to the interior surface of the annular member 24. The cooling air is exhausted from the annular chamber 32 through passages 36 provided adjacent the upstream edge of the annular member 24 and passages 37 provided in the tiles 29. Thus the cooling air from the rectangular cross-section member 33 provides impingement cooling of the annular member 24 within the annular chamber 32 and film cooling of the leading edge of the annular member 24 and of the radially inwardly facing surface 30 defined by the tiles 29.

It will be noted that in order to facilitate film cooling of the leading edge of the annular member 24, portions of the nozzle guide vanes 17 which are adjacent the annular member 24 are cut away as can be seen at 38.

A distance measuring device 39 passes through the annular member 24 and tiles 29 to terminate flush with the annular radially inwardly facing surface 30. The device 39, which may be of any convenient type, is adapted to measure the radial clearance between the annular radially inwardly facing surface 30 and the tips of the rotary aerofoil blades 18 and provide an electrical output which is proportional to that tip clearance. The output from the device 39 is fed into a control unit 40 which in turn provides an electrical output to operate a valve 41 in the cooling air supply pipe 34.

The control unit 40 is so adapted that only sufficient cooling air is permitted to pass through the control valve 41 as is necessary to maintain the temperature of the annular member 24 at a value consistent with an optimum pre-determined range of clearances between the tips of the rotary aerofoil blades 18 and the annular radially inwardly facing surface 30. Thus if the clearance increases out of the predetermined range, an increased flow of cooling air is directed on to the annular member 24 until it thermally contracts to such an extent that the clearance falls back within the optimum predetermined range.

Since the annular member 24 is constituted by a heat pipe 25 it has certain advantages over a similar member which is not so constituted. Thus since heat pipes have extremely high thermal conductivies, they are not prone to localised hot spots and the distortion resulting from the thermal gradients induced by such hot spots is therefore avoided. This means that the annular member 24 remains substantially annular under various turbine operating conditions, thereby ensuring that the rotary aerofoil blade 18 tip clearance remains substantially axiometric around the whole of the annular radially inwardly facing surface 30. A further advantage which accrues from the fact that the annular member 24 has a very high thermal conductivity is that the system for cooling the heat pipe 25 does not need to be complicated. Thus cooling of just a few areas of the heat pipe 25 is sufficient to effectively reduce its overall temperature without the creation of undesirable thermal gradients within it.

There are certain periods during the operation of the turbine 13 in which the temperature of the gases passing through it increase at a very rapid rate. Since the rotary aerofoil blades 18 are each of a comparatively low mass they will thermally expand at a similarly rapid rate under such conditions, thereby creating the possibility of contact occuring between their tips and the annular radially inwardly facing surface 30. The likelihood of this happening may be eliminated however by ensuring that when such conditions prevail, the cooling air supply to the annular chamber 32 through the supply pipe 34 is temporarily suspended. This results in turn in the loss of film cooling on the leading edge of the annular member 24. Consequently the leading edge of the annular member, which is in turn a part of the heat pipe 25, is directly exposed to the hot gas stream passing through the turbine 13. The high thermal conductivity of the heat pipe 25 ensures that it is rapidly heated up by the hot gas stream and consequently thermally expands at fast rate without distortion, thereby maintaining a clearance between the rotary aerofoil blade 18 tips and the annular radially inwardly facing surface 30. Since there is no cooling air flow through the passages 36 and 37 in this situation, some of the hot gases passing through the turbine 13 will in fact pass through these passages into the annular chamber 32. This is beneficial however since it ensures an even greater rate of heating and hence thermal expansion of the heat pipe 25.

There are other possible ways in which contact between the rotary aerofoil blade 18 tip and the annular radially inwardly facing surface 30 may be avoided under certain turbine operating conditions. For instance, the clearance between them could, by suitable dimensioning of the components involved, be so arranged as to be larger than the optimum value when there is danger of the rotary aerofoil blades 18 thermally expanding a greater rate than the heat pipe 25.

Figure 4:
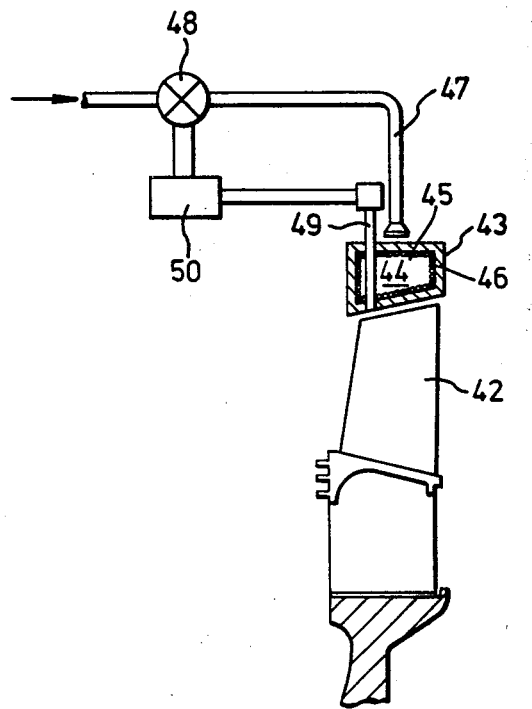
FIG. 4 is a sectioned side view of an alternative form of the turbine part shown in FIG. 3.

In FIG. 4 there is shown a further embodiment of the present invention. An annular array of rotary aerofoil blades 42 suitable for mounting in a turbine similar to that designated 13 in FIG. 1 is surrounded by an annular shroud member 43. The relationship between the tips of the rotary aerofoil blades 42 and the annular shroud member 43 is similar to that of the embodiment shown in FIG. 3 in that there is a small radial clearance between them. However the annular shroud member 43 is solely constituted by an annular heat pipe 44. Thus the annular shroud member 43 defines a sealed, evacuated chamber 45 containing a small amount of sodium, the internal walls of which are covered with a stainless steel mesh wick 46.

A cooling air supply pipe 47 having a control valve 48 is positioned so as to direct cooling air on to the annular shroud member 43 and a suitable distance measuring device 49 is provided to measure the clearance between the aerofoil blade 42 tips and the annular shroud member 43. These correspond with the supply pipe 34 control valve 41 and distance measuring device 39 shown in FIG. 3 and are controlled by a control unit 50 which operates in a similar fashion to the control unit 40 of FIG. 3.

Thus the embodiment of FIG. 4 operates in a similar fashion to the embodiment of FIG. 3 in maintaining the clearance between the tips of the rotary aerofoil blades 42 and the annular shroud member within a predetermined range of values.

Although the two embodiments of the present invention which have been described above are provided with heat pipes which are thermally actuated in the main by cooling air, it is possible that in certain circumstances, it may be desirable to actuate them with hot gases which are additional to those provided by the hot gas stream passing through the turbine 13. Thus the cooling air supply pipes 34 and 47 of the two described embodiments could be replaced by supply pipes which are adapted to supply either hot or cool air or a mixture of the two to the relevant heat pipes. The cool air could be derived from the compressor 11 of the engine and the hot air from any convenient source such as the downstream end of the compressor 11, the combustion equipment 12 or a convenient location in the turbine 13.

It may be found that the annular heat pipes of the two described embodiments may be of such a diameter that their efficiency is impaired as a result of problems associated with the effective operation of their wicks. If so, the annular shroud member may be constituted by more than one heat pipe. These heat pipes would be of segmental form so that together they define an annular assembly.

We claim:
1. A turbine suitable for use in a gas turbine engine having varying operating conditions resulting in changes in temperature of hot gases passing therethrough, said turbine comprising:

an annular array of rotary aerofoil blades having tips, said annular array of aerofoil blades being of a comparatively low mass and having a predetermined rate of thermal expansion and contraction from an increase and a decrease in temperature respectively;

an annular shroud member including a portion defining an annular radially inwardly facing surface and at least one heat pipe defining a major portion thereof, said at least one heat pipe including a sealed container with a condensable vapor therein and capillary means for transporting condensed vapor in liquid form from a cooler area to a hotter area of the sealed container of said at least one heat pipe;

said annular shroud member being located coaxially with and radially outwardly of said rotary aerofoil blades, said tips of said rotary aerofoil blades and said inwardly facing surface of said annular shroud being positioned adjacent each other but radially spaced apart to provide a radial clearance therebetween;

at least one heat pipe having a high thermal conductivity to thereby provide said shroud member with a rapid rate of thermal expansion and contraction dependent upon an increase or decrease in temperature respectively while being substantially isothermal without thermal gradients caused by localized hot spots;

means for maintaining said radial clearance between said tips of said rotary aerofoil blades and said inwardly facing surface of said annular shroud within a predetermined range of values, said maintaining means comprising:

distance measuring means having an output proportional to said radial clearance between said blade tips and said radially inwardly facing surface of said annular shroud;

fluid directing means to direct a temperature regulating fluid onto said at least one heat pipe at least at a position remote from said radially inwardly facing surface of said annular shroud;

flow rate regulating means to regulate the flow rate of said temperature regulating fluid from said fluid directing means onto said at least one heat pipe;

and control means interconnecting said flow rate regulating means and said distance measuring means, said control means reducing the flow rate of the temperature regulating fluid by said flow rate regulating means to said fluid directing means when said radial clearance decreases below the predetermined range of values due to thermal expansion of said annular array of aerofoil blades whereby said heat pipe is heated up and rapidly thermally expands without distortion thereby maintaining the radial clearance within the predetermined range of values, and said control means increasing the flow rate of the temperature regulating fluid by said flow rate regulating means to said fluid directing means when said radial clearance increases above the predetermined range of values due to thermal contraction of said annular array of aerofoil blades whereby said heat pipe is cooled down and rapidly thermally contracts without distortion thereby maintaining the radial clearance within the predetermined range of values.

2. A turbine as claimed in claim 1 wherein said temperature regulating fluid is cooling air.

3. A turbine as claimed in claim 1 wherein said annular shroud member has a configuration defining an annular chamber therein, said annular chamber being at least partially defined by said at least one heat pipe, said fluid directing means being at least partially located within said annular chamber and having a configuration to direct at least some of said temperature regulating fluid directly on to those areas of said at least one heat pipe which at least partially defines said annular chamber.

4. A turbine as claimed in claim 3 wherein said temperature regulating fluid is air.

5. A turbine as claimed in claim 4 wherein said portion of said shroud defining said annular radially inwardly facing surface is interconnected with said annular chamber within said annular shroud member by a plurality of passages, said passages being so disposed as to direct cooling air from said annular chamber to said annular radially inwardly facing surface to provide film cooling thereof.

6. A turbine as claimed in claim 5 wherein said annular shroud member is provided with additional passages which interconnect said annular chamber with areas of said shroud member, other than said annular radially inwardly facing surface, which are exposed to the gas stream passing in operation through said turbine, said passages being so disposed as to provide film cooling of those areas.

7. A turbine as claimed in any one of claims 2 to 6 wherein said major portion of said annular shroud constituted by at least one heat pipe is annular and of generally U-shaped cross-section to provide two radially inwardly extending flanges, said flanges being bridged by surface defining means to define said annular, radially inwardly facing surface, so that said major annular shroud portion and said surface defining means together define said annular chamber.

8. A turbine as claimed in claim 7 wherein said surface defining means comprises a plurality of abutting tiles.

9. A turbine as claimed in claim 8 wherein said tiles are metallic.

10. A turbine as claimed in claim 8 wherein said tiles are ceramic.

* * * * *